US012619473B2

(12) United States Patent
Gong et al.

(10) Patent No.: US 12,619,473 B2
(45) Date of Patent: May 5, 2026

(54) CLOUD SYSTEM RESOURCE SET RECOMMENDATION METHOD AND APPARATUS, AND COMPUTING DEVICE CLUSTER

(71) Applicant: Huawei Cloud Computing Technologies Co., Ltd., Guizhou (CN)

(72) Inventors: Kai Gong, Shenzhen (CN); Xinhou Wang, Shenzhen (CN); Xueyou Wang, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 551 days.

(21) Appl. No.: 17/702,224

(22) Filed: Mar. 23, 2022

(65) Prior Publication Data

US 2022/0214927 A1 Jul. 7, 2022

Related U.S. Application Data

(63) Continuation of application No. PCT/CN2020/117271, filed on Sep. 24, 2020.

(30) Foreign Application Priority Data

Sep. 24, 2019 (CN) .......................... 201910906870.8

(51) Int. Cl.
| | |
|---|---|
| *G06F 9/50* | (2006.01) |
| *G06F 11/30* | (2006.01) |
| *G06F 11/34* | (2006.01) |

(52) U.S. Cl.
CPC .......... *G06F 9/5077* (2013.01); *G06F 11/301* (2013.01); *G06F 11/3442* (2013.01)

(58) Field of Classification Search
CPC .. G06F 9/5077; G06F 11/301; G06F 11/3442; G06F 9/5027; G06F 9/505; G06F 9/5061
See application file for complete search history.

(56) References Cited

U.S. PATENT DOCUMENTS

| | | | |
|---|---|---|---|
| 2013/0042003 A1 | 2/2013 | Franco et al. | |
| 2013/0263209 A1* | 10/2013 | Panuganty | .......... H04L 41/5025 |
| | | | 709/224 |

(Continued)

FOREIGN PATENT DOCUMENTS

| | | |
|---|---|---|
| CN | 106453146 A | 2/2017 |
| CN | 107943423 A | 4/2018 |

(Continued)

*Primary Examiner* — Sisley N Kim
(74) *Attorney, Agent, or Firm* — Conley Rose, P.C.

(57) ABSTRACT

A cloud system resource set recommendation method includes after receiving a cloud system resource set recommendation request triggered by a user and used to request to obtain cloud system resource sets that can support a target cloud service and meet a performance requirement, the recommendation apparatus selects, based on the cloud system resource set recommendation request, from the existing cloud system resource sets supporting the target cloud service, a target cloud system resource set meeting the performance requirement, and feeds back the target cloud system resource set to the user. The user does not need to select a required cloud system resource set from several limited resource sets with fixed configurations, but only needs to notify the recommendation apparatus of a target cloud service and a performance requirement that need to be supported by the cloud system resource set.

20 Claims, 9 Drawing Sheets

(56) References Cited

U.S. PATENT DOCUMENTS

| | | | |
|---|---|---|---|
| 2014/0200947 A1 | 7/2014 | Gujar et al. | |
| 2014/0280946 A1 | 9/2014 | Mukherjee et al. | |
| 2016/0057077 A1* | 2/2016 | Gomatam | H04L 41/5051 |
| | | | 709/226 |
| 2016/0080519 A1* | 3/2016 | Hansen | H04L 67/51 |
| | | | 709/219 |
| 2017/0329978 A1 | 11/2017 | Dave et al. | |
| 2018/0359313 A1 | 12/2018 | Russinovich et al. | |
| 2019/0312743 A1* | 10/2019 | Li | H04L 43/0876 |
| 2020/0310853 A1* | 10/2020 | Featonby | G06F 9/45558 |
| 2020/0349061 A1* | 11/2020 | Bonas | H04L 45/70 |
| 2021/0019195 A1* | 1/2021 | Aronov | G06F 9/4856 |
| 2021/0182106 A1 | 6/2021 | Wang | |
| 2022/0214927 A1 | 7/2022 | Gong et al. | |

FOREIGN PATENT DOCUMENTS

| | | | |
|---|---|---|---|
| CN | 108241716 A | 7/2018 | |
| CN | 109412829 A | 3/2019 | |
| CN | 110837417 A | 2/2020 | |

* cited by examiner

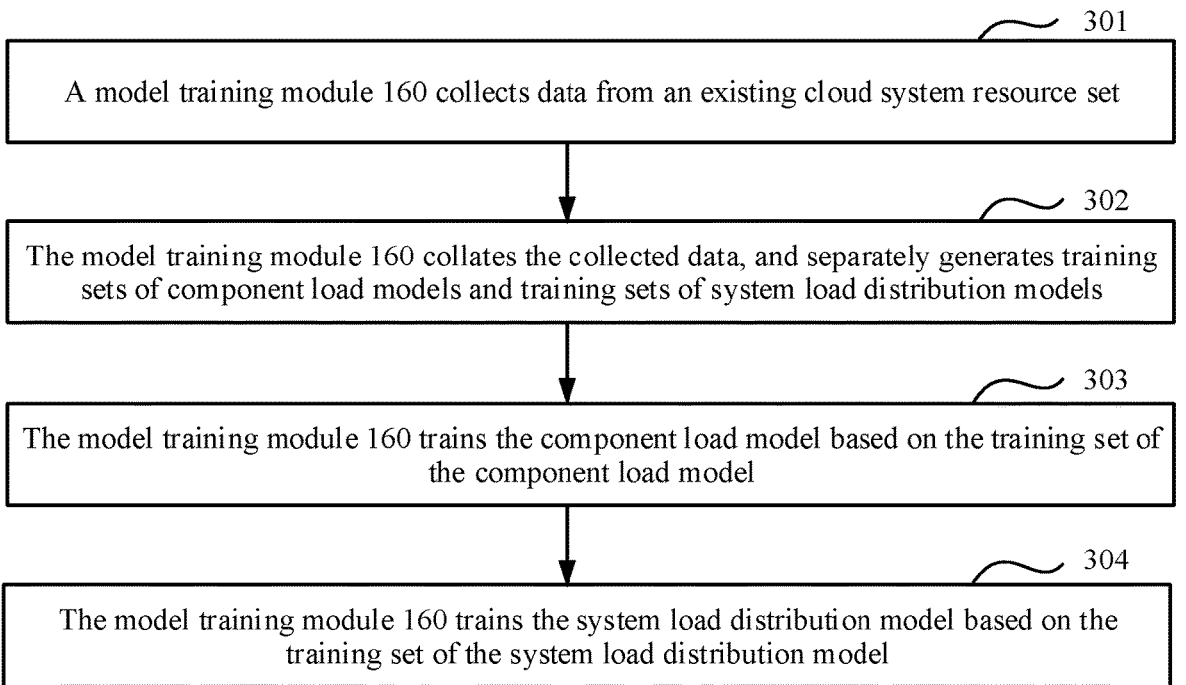

301

A model training module 160 collects data from an existing cloud system resource set

302

The model training module 160 collates the collected data, and separately generates training sets of component load models and training sets of system load distribution models

303

The model training module 160 trains the component load model based on the training set of the component load model

304

The model training module 160 trains the system load distribution model based on the training set of the system load distribution model

FIG. 3

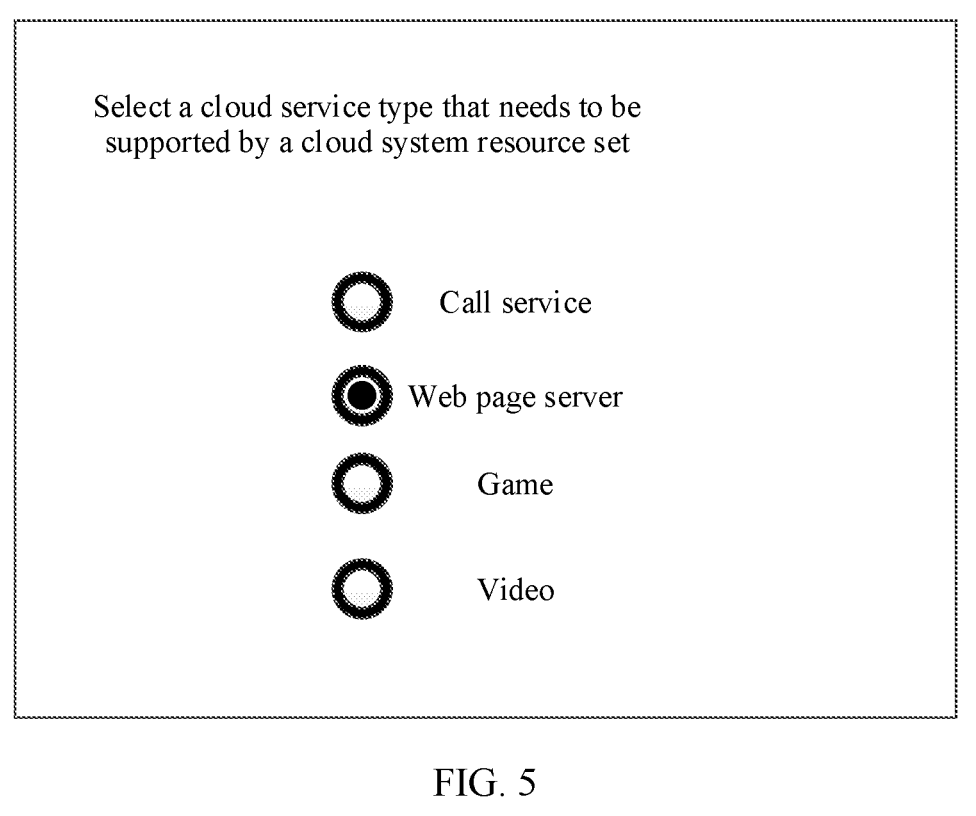

Select a cloud service type that needs to be
supported by a cloud system resource set ◯    Call service ◉    Web page server ◯    Game ◯    Video

FIG. 5

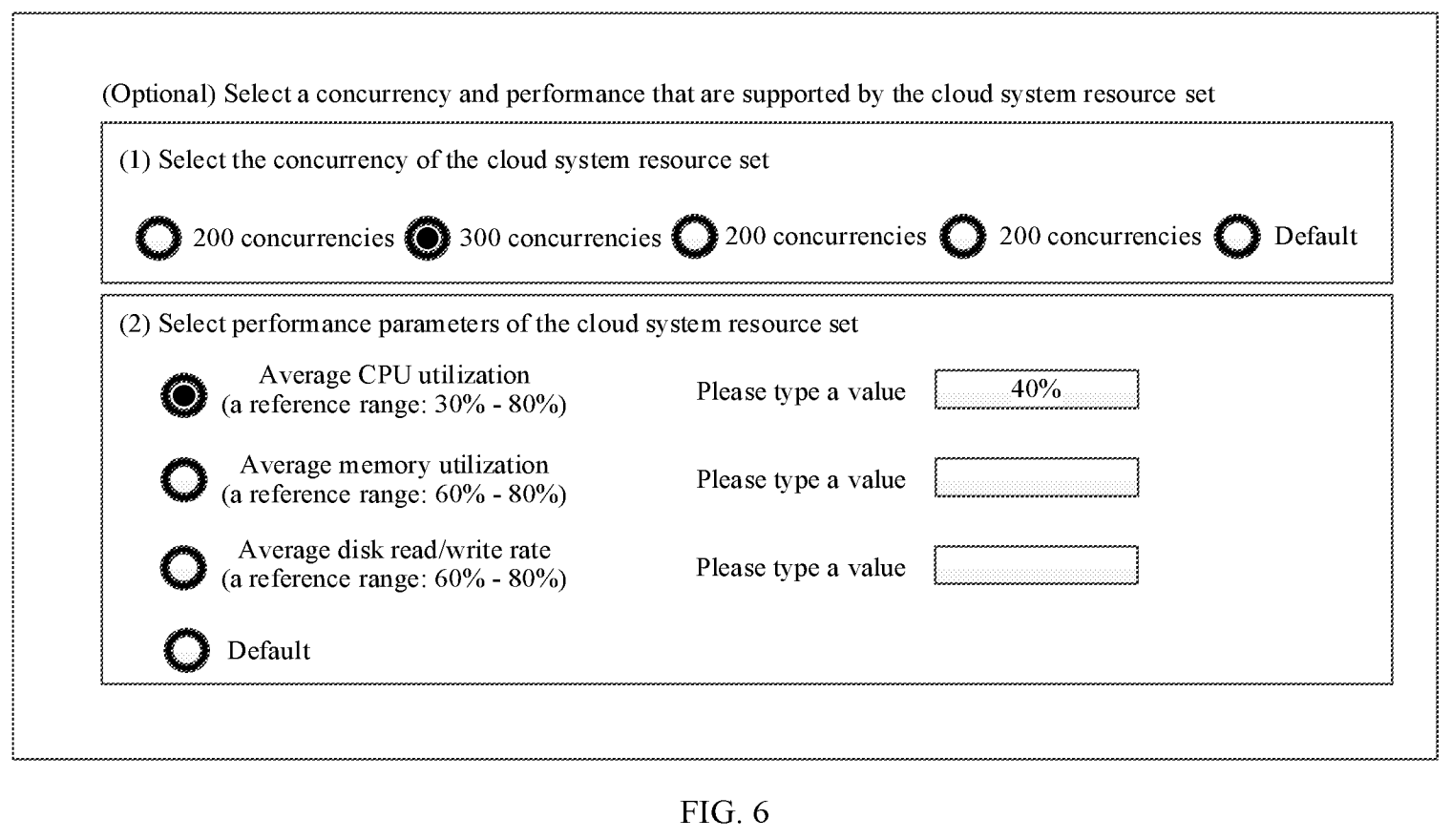

(Optional) Select a concurrency and performance that are supported by the cloud system resource set (1) Select the concurrency of the cloud system resource set ○ 200 concurrencies    ● 300 concurrencies    ○ 200 concurrencies    ○ 200 concurrencies    ○ Default (2) Select performance parameters of the cloud system resource set ● Average CPU utilization
(a reference range: 30% - 80%)          Please type a value    | 40% |

○ Average memory utilization
(a reference range: 60% - 80%)          Please type a value    |      |

○ Average disk read/write rate
(a reference range: 60% - 80%)          Please type a value    |      |

○ Default

FIG. 6

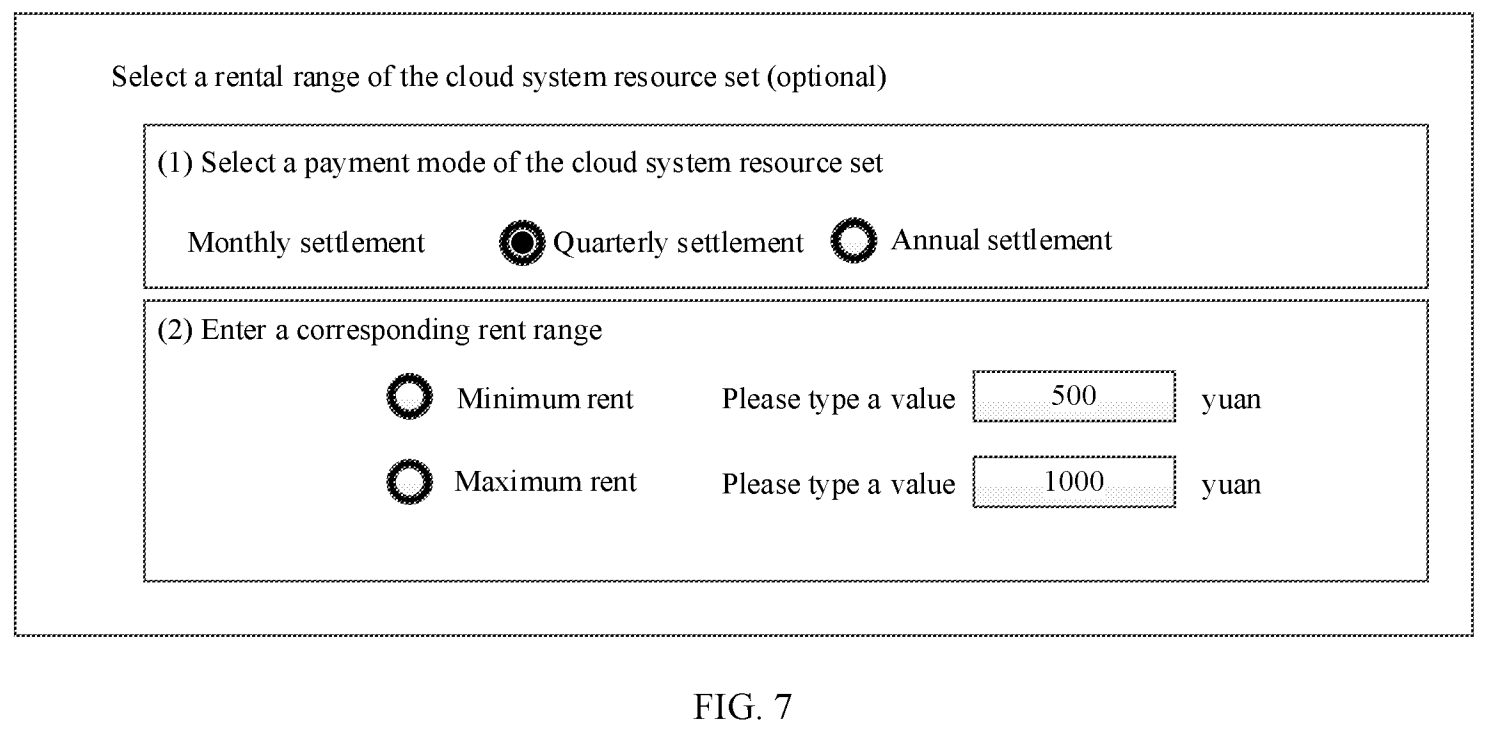

Select a rental range of the cloud system resource set (optional)

(1) Select a payment mode of the cloud system resource set

Monthly settlement     ● Quarterly settlement     ○ Annual settlement (2) Enter a corresponding rent range ○ Minimum rent     Please type a value     [ 500 ]     yuan ○ Maximum rent     Please type a value     [ 1000 ]     yuan

FIG. 7

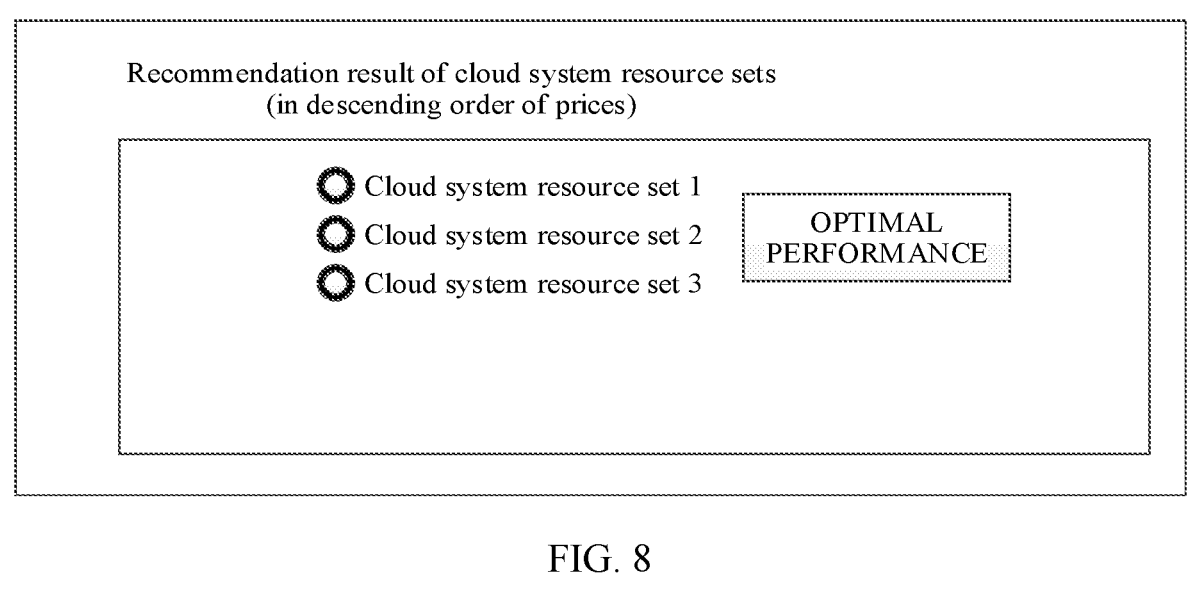

Recommendation result of cloud system resource sets
(in descending order of prices)

⬭ Cloud system resource set 1

⬭ Cloud system resource set 2          OPTIMAL
                                       PERFORMANCE
⬭ Cloud system resource set 3

FIG. 8

CLOUD SYSTEM RESOURCE SET RECOMMENDATION METHOD AND APPARATUS, AND COMPUTING DEVICE CLUSTER

CROSS-REFERENCE TO RELATED APPLICATIONS

This application is a continuation of International Patent Application No. PCT/CN2020/117271 filed on Sep. 24, 2020, which claims priority to Chinese Patent Application No. 201910906870.8 filed on Sep. 24, 2019, the disclosure of which is hereby incorporated by reference in its entirety.

TECHNICAL FIELD

This application relates to the field of computer technologies, and in particular, to a cloud system resource set recommendation method and apparatus, and a computing device cluster.

BACKGROUND

With rapid development of cloud computing technologies, more cloud services may be deployed on a cloud for use by users. Tenants usually need to rent resources on the cloud in advance for the cloud services deployed on the cloud, and a resource set including these resources is constructed as a cloud system. The cloud system may provide cloud services for the users by running applications.

Currently, the cloud provides only limited resource sets with a plurality of fixed configurations. The tenants can select one of these resource sets based on requirements of the tenants. However, these resource sets with fixed configurations usually cannot fully meet the requirements of the tenants. For example, a tenant A needs to rent a resource set, where a rent is less than 1000 yuan/month, the resource set needs to support 300 concurrencies (300 requests are processed simultaneously), and utilization of a central processing unit (CPU) is higher than 40%. The cloud usually provides only the resource sets with the fixed configurations. Each fixed resource configuration usually supports only one concurrency, and the fixed resource configurations support limited concurrencies. For example, the fixed resource configurations support only 100 concurrencies, 500 concurrencies, and 1000 concurrencies.

The requirement of the tenant can be met only when the tenant selects a resource set that is provided by the cloud and that supports 500 concurrencies. The cloud system constructed as the resource set can provide a better cloud service. However, because a large quantity of resources is configured in the resource set, costs are relatively high, resources are wasted, and the requirements of the tenants cannot be met.

SUMMARY

This application provides a cloud system resource set recommendation method and apparatus, and a computing device cluster, to recommend a relatively suitable cloud system resource set to a user.

According to a first aspect, this application provides a cloud system resource set recommendation method. The method may be performed by a recommendation apparatus. The method includes that a user may send a cloud system resource set recommendation request to the recommendation apparatus in a trigger manner such as tapping a display or typing a parameter, where the cloud system resource set recommendation request is used to request to obtain cloud system resource sets that can support a target cloud service and that meets a performance requirement required by the user, the target cloud service can be provided in cooperation with at least one functional component, and each functional component implements a different function. After receiving the cloud system resource set recommendation request triggered by the user, the recommendation apparatus may select, based on the cloud system resource set recommendation request, a target cloud system resource set from the existing cloud system resource sets supporting the target cloud service, where the target cloud system resource set includes the at least one functional component. The recommendation apparatus may further feed back the target cloud system resource set to the user.

According to the foregoing method, the user does not need to select the required cloud system resource set from limited several resource sets with fixed configurations, but only needs to notify the recommendation apparatus of the target cloud service that needs to be supported by the cloud system resource set and the performance requirement that needs to be met. This effectively simplifies a user operation. The recommendation apparatus selects from the existing cloud system resource sets supporting the target cloud service. A selection range is no longer limited to several cloud system resource sets, and a larger selection range helps to select a cloud system resource set that better meets the requirement of the user.

In a possible implementation, the performance requirement may be represented as an overall performance requirement on the target cloud system resource set and a performance requirement on each functional component in the target cloud system resource set. For example, the performance requirement includes a concurrency that needs to be supported by the target cloud system resource set. In addition to the concurrency that needs to be supported by the target cloud system resource set, the performance requirement may further include one or more of the following: average CPU utilization that needs to be achieved by the target cloud system resource set, average memory utilization that needs to be achieved by the target cloud system resource set, an average disk read/write rate that needs to be achieved by the target cloud system resource set, average CPU utilization that needs to be achieved by any functional component in the target cloud system resource set, average memory utilization that needs to be achieved by any functional component in the target cloud system resource set, and an average disk read/write rate that needs to be achieved by any functional component in the target cloud system resource set.

According to the foregoing method, the performance requirement may include a relatively large variety of information, so that the recommendation apparatus selects a target cloud system resource set that can truly approach a user requirement.

In a possible implementation, the cloud system resource set recommendation request may further include a rent range that needs to be met by the target cloud system resource set, and the recommendation apparatus may select, from the existing cloud system resource sets supporting the target cloud service, the target cloud system resource set whose rent is within the rent range.

According to the foregoing method, the cloud system resource set recommendation request carries the rent range, so that the selected target cloud system resource set can meet a rent requirement of the user.

In a possible implementation, when selecting, based on the existing cloud system resource sets supporting the target cloud service, the cloud system resource set meeting the performance requirement, the recommendation apparatus selects, based on system load distribution models corresponding to the existing cloud system resource sets used to support the target cloud service and a component load model corresponding to the at least one functional component, and data determined based on the system load distribution models and the component load model, from the existing cloud system resource sets supporting the target cloud service, the target cloud system resource set meeting the performance requirement.

A system load distribution model corresponding to each cloud system resource set is used to determine load of each functional component in the cloud system set based on load of the cloud system resource set, and a component load model corresponding to each functional component is used to determine performance data of the functional component based on the load of the functional component.

By using the foregoing method, the recommendation apparatus can relatively quickly determine the target cloud system resource set by using the system load distribution model and the component load model, so that the target cloud system resource set can be selected effectively.

In a possible implementation, before determining the target cloud system resource set by using the system load distribution models and the component load model, the recommendation apparatus may generate system load distribution models and a component load model in advance. For example, the recommendation apparatus may first collect structure data and running data of the existing cloud system resource sets supporting the target cloud service, where structure data of any cloud system resource set supporting the target cloud service indicates composition of functional components in the cloud system resource set and a resource configuration of each functional component, and running data of any cloud system resource set supporting the target cloud service is used to indicate performance of the cloud system resource set in a running process and performance of each functional component in the cloud system resource set of the cloud system resource set, and then, generate, based on the structure data and the running data, the system load distribution models corresponding to the existing cloud system resource sets supporting the target cloud service and the component load model corresponding to the functional component. In the foregoing description, only an example in which the recommendation apparatus generates the system load distribution model and the component load model is used. Alternatively, another apparatus may generate the system load distribution model and the component load model, and configure the system load distribution model and the component load model in the recommendation apparatus.

According to the foregoing method, a process of generating the system load distribution model and the component load model is performed based on the pre-collected structural data and running data that are of the existing cloud system resource sets supporting the target cloud service. This can ensure that the effective system load distribution models and the component load model are generated. The system load distribution model and component load model produce more accurate data.

In a possible implementation, when generating, based on the structure data and the running data, the system load distribution models corresponding to the existing cloud system resource sets supporting the target cloud service and the component load model corresponding to the at least one functional component, the recommendation apparatus may integrate the structure data and the running data into training sets of a plurality of component load models and training sets of the plurality of system load distribution models, generate, based on the training sets of the component load models, the component load model corresponding to the at least one functional component, and generate, based on the training sets of the system load distribution models, the system load distribution models corresponding to the existing cloud system resource sets supporting the target cloud service.

By using the foregoing method, the recommendation apparatus may collate the structure data and the running data, to generate the training sets of the plurality of component load models and the training sets of the plurality of system load distribution models, so as to generate the relatively effective system load distribution models and the component load model.

According to a second aspect, an embodiment of this application further provides a recommendation apparatus. For beneficial effects, refer to the descriptions of the first aspect. Details are not described herein again. The apparatus has a function of implementing actions in the method example in the first aspect. The function may be implemented by hardware, or may be implemented by hardware executing corresponding software. The hardware or software includes one or more modules corresponding to the foregoing functions. In a possible design, a structure of the apparatus includes a receiving module, a resource selection module, a sending module, a component load model, a system load distribution model, and a model training module. These modules or models may perform corresponding functions in the method example in the first aspect. For details, refer to detailed descriptions in the method example. Details are not described herein.

According to a third aspect, an embodiment of this application further provides a computing device, where the computing device includes a processor and a memory, and may further include a communications interface. Optionally, the computing device further includes a display. The processor executes the program instructions in the memory to perform the method according to any one of the first aspect or the possible implementations of the first aspect. The memory is coupled to the processor, and stores program instructions and data that are necessary in a process of determining traffic flows. The communications interface is configured to communicate with another device, for example, receive a cloud system resource set recommendation request. The display is configured to display information to a user under triggering of the processor, for example, display a target cloud system resource set.

According to a fourth aspect, this application provides a computing device cluster, where the computing device cluster includes at least one computing device. Each computing device includes a memory and a processor. A processor of the at least one computing device is configured to access code in the memory to perform the method according to any one of the first aspect or the possible implementations of the first aspect.

According to a fifth aspect, this application provides a non-transient readable storage medium. When the non-transient readable storage medium is executed by a computing device, the computing device performs the method provided in any one of the first aspect or the possible implementations of the first aspect. The storage medium stores a program. The storage medium includes but is not limited to a volatile memory, for example, a random-access memory (RAM), or a non-volatile memory (NVM), such as a flash memory, a hard disk drive (HDD), and a solid-state drive (SSD).

According to a sixth aspect, this application provides a computer program product. The computer program product includes computer instructions. When the computer instructions are executed by a computing device, the computing device performs the method provided in any one of the first aspect or the possible implementations of the first aspect. The computer program product may be a software installation package. When the method according to any one of the first aspect or the possible implementations of the first aspect needs to be used, the computer program product may be downloaded to and executed on the computing device.

According to a seventh aspect, this application further provides a computer chip. The chip is connected to a memory, and the chip is configured to read and execute a software program stored in the memory, to perform the method provided in the first aspect or any possible implementation of the first aspect.

BRIEF DESCRIPTION OF DRAWINGS

FIG. 3 is a schematic diagram of a training method for a component load model and a system load distribution model according to this application;

FIG. 5 is a schematic diagram of a selection interface displayed to a user according to this application;

FIG. 6 is a schematic diagram of another selection interface displayed to a user according to this application;

FIG. 7 is a schematic diagram of another selection interface displayed to a user according to this application; and FIG. 8 is a schematic diagram of an interface for displaying a target cloud system resource set to a user according to this application.

DESCRIPTION OF EMBODIMENTS

Figure 1:
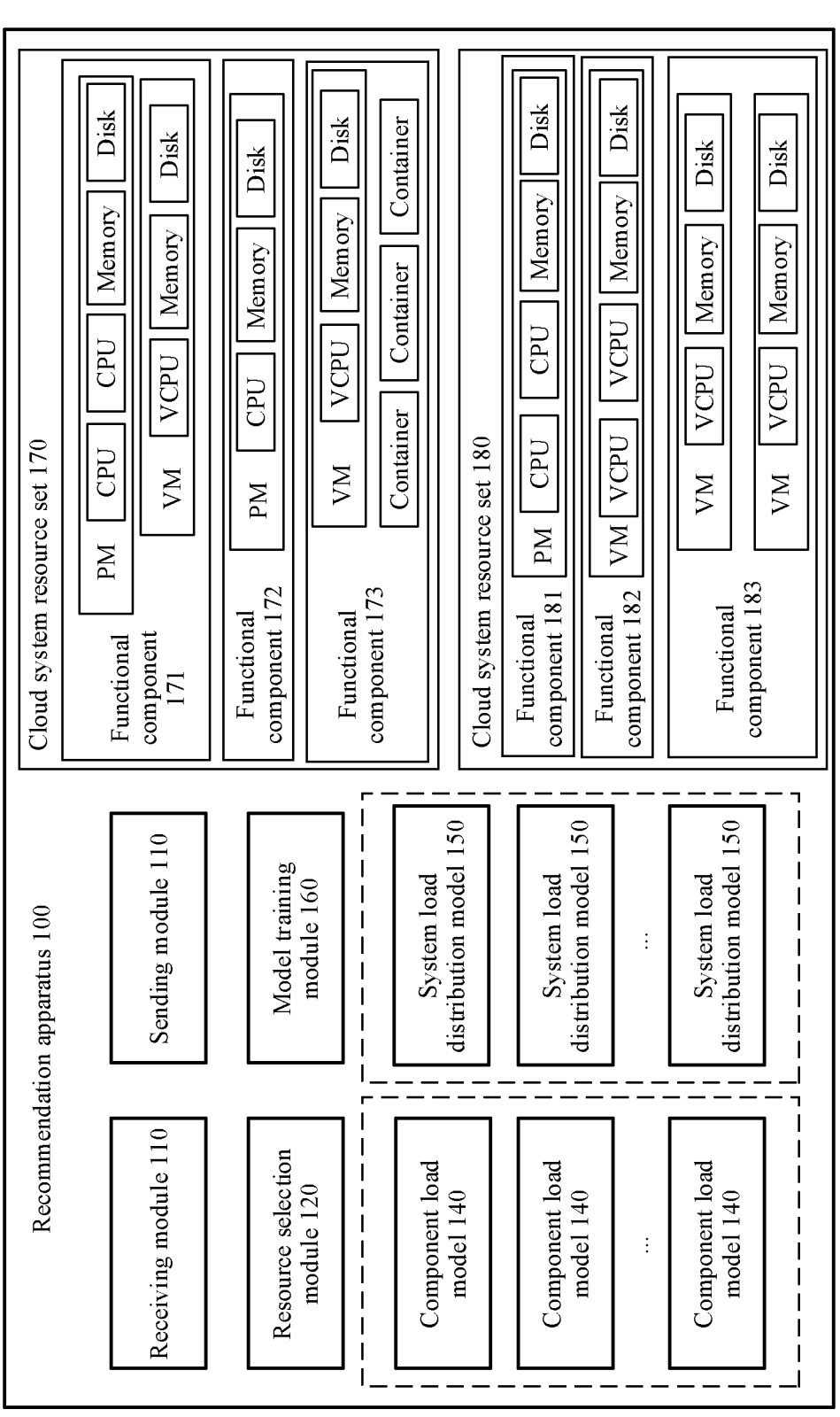
FIG. 1 is a schematic diagram of a structure of a recommendation apparatus according to this application.

Usually, a cloud system resource set may be used to support a cloud service (the cloud service may also be referred to as a cloud business), and the cloud service that can be supported by the cloud system resource set depends on an application running on each functional component in the cloud system resource set. From a perspective of a cloud service, a cloud service may be deployed in different cloud system resource sets, and performance of each cloud system resource set affects quality of the provided cloud service.

Performance of any cloud system resource set is related to a type of a functional component included in the cloud system resource set and a resource configuration of each functional component. The cloud system resource set may include one or more functional components, each functional component is configured to implement one function, and a plurality of functional components jointly support one cloud service. For example, one cloud system resource set supporting a call service may include three functional components: a functional component configured to receive a voice, a functional component configured to process a voice (for example, denoising), and a functional component configured to output a voice. Another cloud system resource set providing the call service may include two functional components: a functional component configured to receive a voice and a functional component configured to output a voice. The two cloud system resource sets both can be used to provide the call service, but include different functional components and provide cloud services of different quality. For example, the one cloud system resource set supporting the call service includes the functional component configured to process the voice, to process the received voice, so that a finally output voice can be clearer. The cloud system resource set can provide a better call service for a user in a noisy environment. However, the other cloud system resource set providing the call service does not include the functional component configured to process the voice, and a voice processing operation is omitted, so that voice transmission efficiency can be improved. Although clarity of the output voice cannot be better ensured, timely performance of voice transmission can be better ensured. The cloud system resource set is applicable to a scenario in which a relatively high requirement is imposed on a voice transmission speed.

It should be noted that, if the two cloud system resource sets include same functional components, and resource configurations of functional components that can implement a same function in the two cloud system resource sets are different, the two cloud system resource sets also belong to different cloud system resource sets.

A resource configuration of any functional component includes any one or more of the following: a quantity of virtual machines (VMs) included in the functional component, a quantity of containers included in the functional component, a quantity of physical machines (PMs) included in the functional component, a quantity of virtual CPUs (VCPUs) of each virtual machine, a memory capacity of each virtual machine, a disk capacity of each virtual machine, a quantity of CPUs of each physical machine, a memory capacity of each physical machine, and a disk capacity of each physical machine. For ease of description, a virtual machine or a physical machine in a functional component is referred to as an instance in the functional component.

It can be learned that different cloud system resource sets support cloud services of different quality. When renting a cloud system resource set, a tenant may select an appropriate cloud system resource set based on audience of the cloud service and an application scenario. Several limited cloud system resource sets provided by a cloud cannot meet a requirement of the tenant. Therefore, the embodiments of this application provide a cloud system resource set recommendation method. Before the system recommendation method is described, a system architecture to which the embodiments of this application are applicable is first described.

An embodiment of this application provides a cloud system resource recommendation method, and the method is executed by a recommendation apparatus. FIG. 1 is a schematic diagram of a structure of a recommendation apparatus according to an embodiment of this application. The recommendation apparatus 100 includes a receiving module 110, a resource selection module 120, and a sending module 130. The recommendation apparatus 100 may include a component load model 140 and a system load distribution model 150. A quantity of component load models 140 and a quantity of system load distribution models 150 are not limited in this embodiment of this application. The quantity of system load distribution models 150 is related to a quantity of existing cloud system resource sets. The quantity of component load models 140 is related to a quantity of types of functional components that may be included in the existing cloud system resource sets.

The receiving module 110 is configured to receive a cloud system resource set recommendation request triggered by a user. The cloud system resource set recommendation request is used to request to obtain a cloud system resource set that can support a cloud service of a specific type.

The system load distribution model 150 is configured to determine load of each functional component in a cloud resource set based on input load of the cloud system resource set, where a cloud system resource set corresponds to one system load distribution model.

The component load model 140 is configured to determine performance data of the corresponding functional component based on input load of the functional component, where one functional component corresponds to one component load model.

The resource selection module 120 is configured to select a cloud system resource set from the existing cloud system resource sets supporting the cloud service of the type. Further, the resource selection module may select, by using the component load model 140 and the system load distribution model 150, the cloud system resource set from the existing cloud system resource sets supporting the cloud service of the type.

As shown in FIG. 1, for example, two cloud system resource sets selected by the resource selection module 120 are drawn: a cloud system resource set 170 and a cloud system resource set 180. The cloud system resource set 170 includes a functional component 171, a functional component 172, and a functional component 173. The functional component 171 includes one PM and one VM. The PM in the functional component 171 includes two CPUs, a memory, and a disk. A memory capacity and a disk capacity of the PM in the functional component 171 are 128 gigabytes (GB) and 500 GB respectively. The functional component 172 includes one PM. The PM in the functional component 172 includes a CPU, a memory, and a disk. A memory capacity and a disk capacity of the VM in the functional component 172 are 256 GB and 1 terabyte (T) respectively. The functional component 173 includes one VM and three containers. The VM in the functional component 173 includes one VCPU, a memory, and a disk. A memory capacity and a disk capacity of the VM in the functional component 173 are 256 GB and 1 TB respectively.

The cloud system resource set 180 includes a functional component 181, a functional component 182, and a functional component 183. The functional component 181 includes one PM. The PM in the functional component 181 includes two CPUs, a memory, and a disk. A memory capacity and a disk capacity in the functional component 181 are 256 GB and 500 GB respectively. The functional component 182 includes one VM. The VM in the functional component 182 includes two VCPUs, a memory, and a disk. A memory capacity and a disk capacity of the VM in the functional component 182 are 256 GB and 1 TB respectively. The functional component 183 includes two VMs. Each VM in the functional component 183 includes one VCPU, a memory, and a disk. A memory capacity and a disk capacity of each VM in the functional component 183 are 128 GB and 500 GB respectively.

The sending module 130 is configured to send the target cloud system resource set selected by the resource selection module 120 to the user.

The component load model 140 and the system load distribution model 150 in the recommendation apparatus 100 may be trained by an apparatus other than the recommendation apparatus 100 and configured in the recommendation apparatus. In a possible implementation, the recommendation apparatus 100 may include a model training module 160. The model training module 160 is configured to train the component load model 140 and the system load distribution model 150, and configure the trained component load model 140 and the system load distribution model 150 in the recommendation apparatus 100.

Figure 2A:
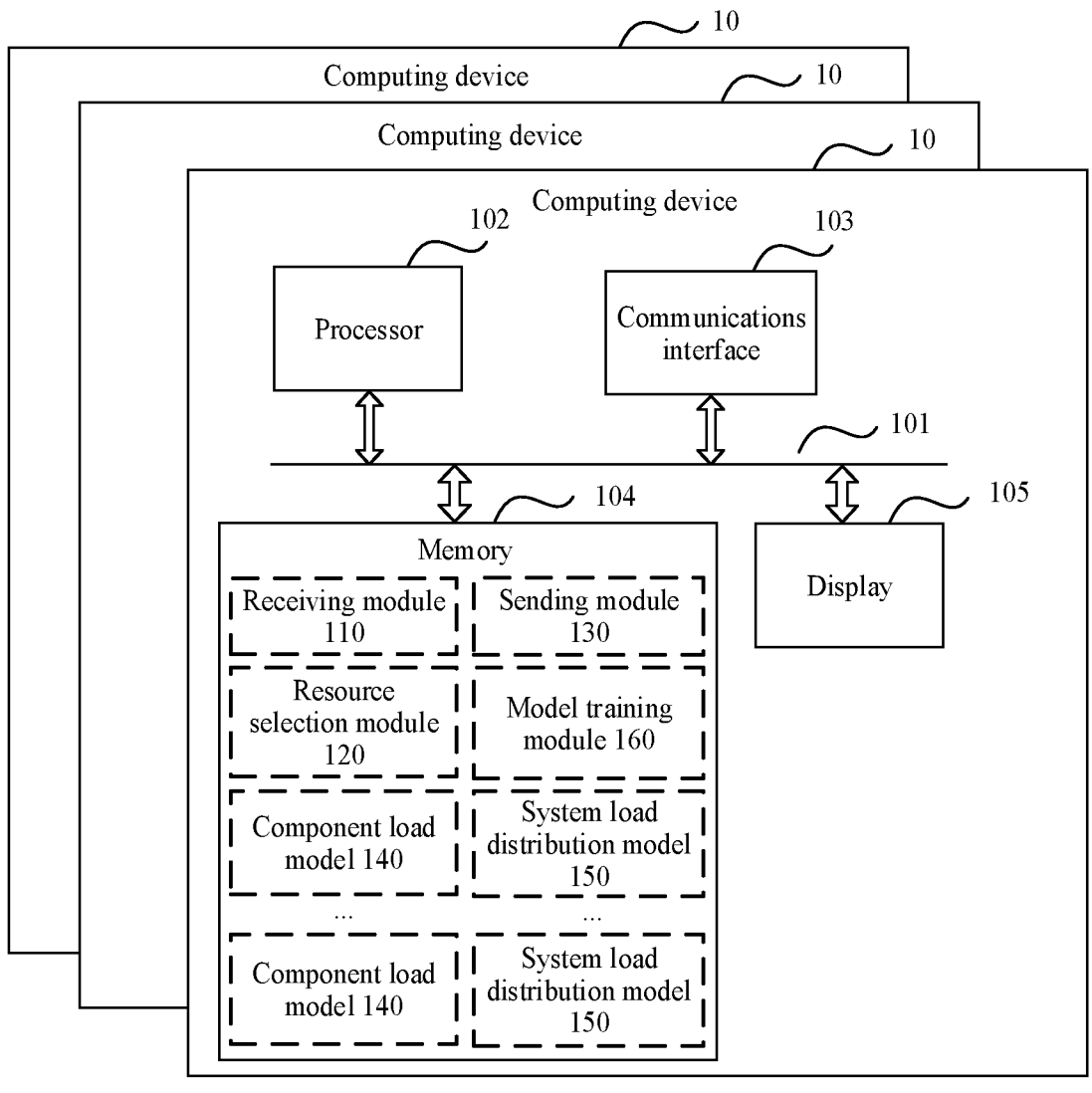
FIG. 2A is a schematic diagram of a structure of a computing device cluster according to this application.

The following describes a system architecture to which an embodiment of this application is applicable. FIG. 2A shows a computer cluster according to an embodiment of this application. The computer cluster includes at least one computing device 10. A communication channel is established between computing devices 10 through a communications network.

Each computing device 10 includes a bus 101, a processor 102, a communications interface 103, and a memory 104. Optionally, the computing device 10 may further include a display 105. The processor 102, the memory 104, and the communications interface 103 communicate with each other by using the bus 101.

The processor 102 may include one or more general-purpose processors, for example, a CPU, or a combination of a CPU and a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof.

The memory 104 may include a volatile memory, for example, a RAM. Alternatively, the memory 104 may include a non-volatile memory, for example, a read-only memory (ROM), a flash memory, an HDD, or an SSD. The memory 104 may further include a combination of the foregoing types.

The memory 104 stores executable code. The processor 102 may read the executable code in the memory 104 to implement a function, and may further communicate with another computing device through the communications interface 103. The processor 102 may further trigger the display 105 to display information to a user, such as information included in interfaces shown in FIG. 5 to FIG. 8 in this embodiment of this application.

In this embodiment of this application, the processor 102 may implement functions of one or more modules (for example, one or more of the following: the receiving module 110, the resource selection module 120, the sending module 130, the component load model 140, the system load distribution model 150, and the model training module 160) of the recommendation apparatus 100. In this case, the memory 104 stores the receiving module 110, the resource selection module 120, the sending module 130, the component load model 140, and the system load distribution model 150 in the recommendation apparatus 100.

In this embodiment of this application, the processors 102 in the plurality of computing devices 10 may work in coordination to perform the cloud system resource set recommendation method provided in the embodiments of this application.

Figure 2B:
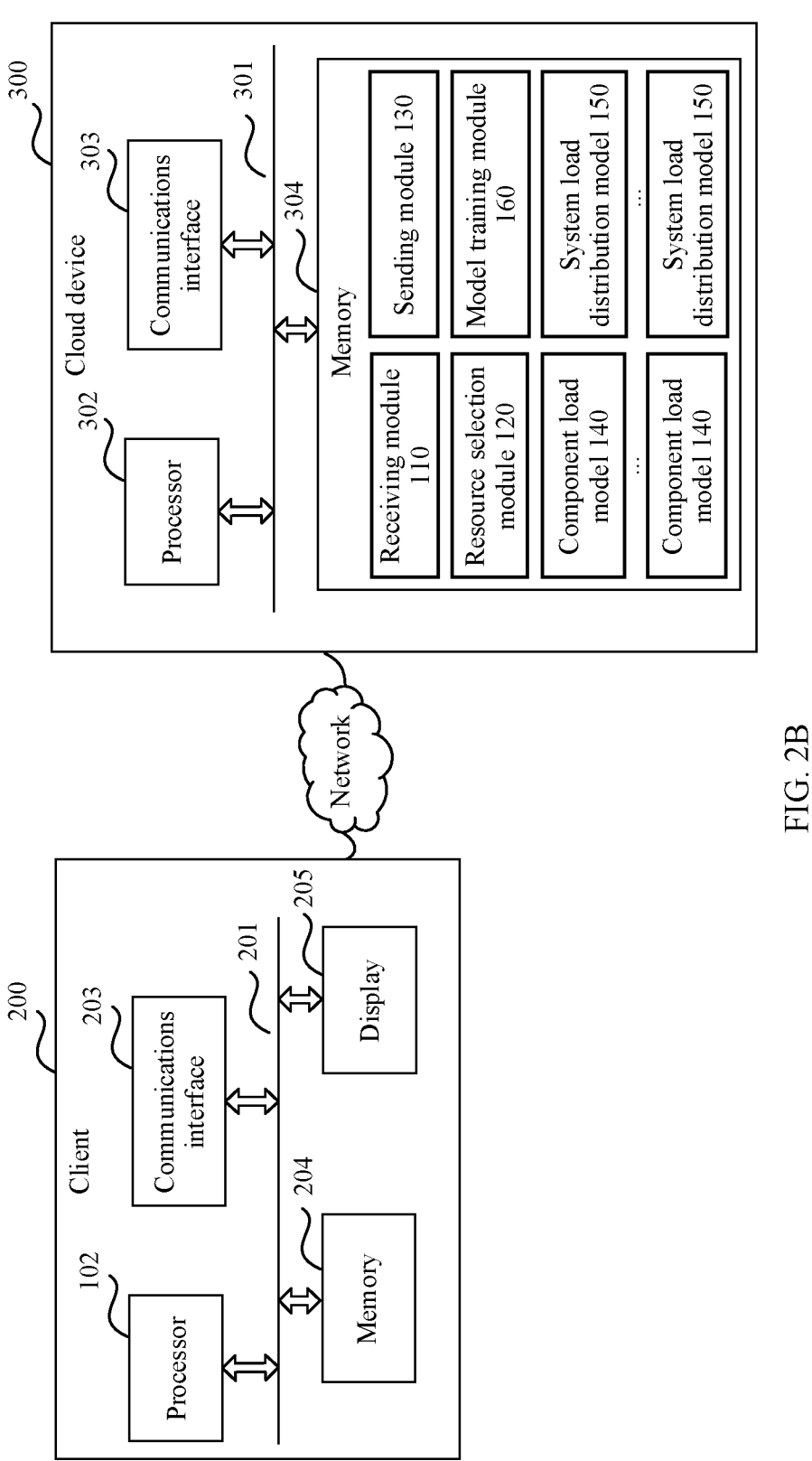
FIG. 2B is a schematic diagram of a system architecture according to this application.

FIG. 2B is a system architecture according to an embodiment of this application. The system architecture includes a client 200 and a cloud device 300 on which a recommendation apparatus is deployed. The client 200 is connected to the cloud device 300 through a network. The cloud device

300 is located in a cloud environment, and may be a server or a virtual machine deployed in a cloud data center. In FIG. 2B, only an example in which the recommendation apparatus is deployed on one cloud device 300 is used. In a possible implementation, the recommendation apparatus may be distributedly deployed on a plurality of cloud devices 300.

As shown in FIG. 2B, the client 200 includes a bus 201, a processor 202, a communications interface 203, and a memory 204. Optionally, the client 200 further includes a display 205. The processor 202, the memory 204, and the communications interface 203 communicate with each other by using the bus 201. For types of the processor 202 and the memory 204, refer to related descriptions of the processor 102 and the memory 104. Details are not described herein again. The memory 204 stores executable code, and the processor 202 may read the executable code in the memory 204 to implement a function. The processor 202 may further trigger the display 205 to display information to a user, such as the information included in the interfaces shown in FIG. 5 to FIG. 8 in this embodiment of this application. The processor 202 may further communicate with the cloud device 300 through the communications interface 203. For example, the processor 202 may prompt, by using the display, the user to input information, where the information may be information carried in a cloud system resource set recommendation request, for example, a type of a cloud service that needs to be supported by a cloud system resource set and a performance requirement of the cloud system resource set, and send, to the cloud device 300 through the communications interface 203, the cloud system resource set recommendation request carrying the information, for example, the type of the cloud service that needs to be supported by the cloud system resource set and the performance requirement of the cloud system resource set.

As shown in FIG. 2B, the cloud device 300 includes a bus 301, a processor 302, a communications interface 303, and a memory 304. The processor 302, the memory 304, and the communications interface 303 communicate with each other by using the bus 301. For types of the processor 302 and the memory 304, refer to related descriptions of the processor 102 and the memory 104. Details are not described herein again. The memory 304 stores executable code. The processor 302 may read the executable code in the memory 304 to implement a function, and may further communicate with the client 200 through the communications interface 303. In this embodiment of this application, refer to FIG. 2B. Processors 302 of a plurality of cloud devices 300 may cooperate to implement a function of the recommendation apparatus 100. In this case, the memory 304 stores one or more of the receiving module 110, the resource selection module 120, the sending module 130, the component load model 140, the system load distribution model 150, and the model training module 160.

After receiving the cloud system resource set recommendation request from the client 200 through the communications interface 303, the processor 302 may invoke the modules stored in the memory 304 to implement the cloud system resource set recommendation method provided in this embodiment of this application, and select a cloud system resource set for the user. The processor 302 may send the selected cloud system resource set to the client 200 through the communications interface 303.

After the processor 202 in the client 200 receives, through the communications interface 203, the cloud system resource set selected by the cloud device 300, the processor 202 may trigger the display 205 to display the selected cloud system resource set to the user.

Regardless of which system architecture is used by the recommendation apparatus, two different types of models may be configured in the recommendation apparatus in this embodiment of this application.

One type is the component load model 140. Each functional component corresponds to one component load model 140. The component load models 140 are generated based on load of the functional components in various existing cloud system resource sets and performance data of the functional components. In this way, the component load models 140 corresponding to the functional components may determine the performance data of the functional components based on the input load of the functional components.

The load of the functional component may be represented by using a concurrency (that is, a quantity of internal requests received by the functional component at a specific time) of the functional component, and may also be represented by using another parameter used to reflect the load of the functional component.

The performance data of the functional component includes any one or more of the following: average CPU (including a VCPU) utilization of the functional component, average memory utilization of the functional component, and an average disk read/write rate (or input/output operations per second (IOPS)) of the functional component. In this embodiment of this application, only an example in which the performance data of the functional component includes the foregoing data is used for description. It should be understood that the performance data of the functional component may further include other data that can reflect performance of the functional component.

The average CPU (including the VCPU) utilization of the functional component is equal to average CPU utilization of all instances (one instance is a VM or a physical machine) in the functional component. CPU utilization of an instance reflects a proportion of the CPU running duration to total duration in a period.

The average memory utilization of the functional component reflects a proportion of an occupied memory of the functional component to a total memory of the functional component. Average IOPS of disks of the functional component is equal to average IOPS of disks of all instances in the functional component, and IOPS of disks of one instance is disk read/write times per second.

The performance data of the foregoing three functional components is merely an example. A specific data type of the performance data of the functional component is not limited in this embodiment of this application. All data that can reflect the performance of the functional component is applicable to this embodiment of this application.

Another type is the system load distribution model 150. A cloud system resource set corresponds to one system load distribution model 150. The system load distribution model 150 corresponding to the cloud system resource set is generated based on load of the existing cloud system resource set and load of each functional component in the cloud system resource set. In this way, the system load distribution model 150 corresponding to the cloud system resource set may determine the load of each functional component in the cloud system resource set based on the load of the cloud system resource set.

The load of the cloud system resource set may be represented by a concurrency of the cloud system resource set (that is, a quantity of external requests received by the cloud system at a specific time), and may further be represented by using another parameter used to reflect the load of the cloud system resource set. In this embodiment of this application, the load of the cloud system resource set is represented by using the concurrency of the cloud system resource set. For a manner of representing the load of the functional component, refer to the foregoing description. Details are not described herein again.

It should be understood that a request involved in the concurrency in the cloud system resource set is an external request, and the external request is a request initiated by a device or a user outside the cloud system resource set, for example, a request triggered when the user needs a cloud service. A request related to the concurrency of the functional component is an internal request initiated by the functional component, and the internal request is a request initiated by the functional component in the cloud system resource set. For example, a cloud service provided by the cloud system resource set for the user is a web page service. The cloud system resource set may include three functional components: a front-end component, a back-end component, and a database component. A web page seen by the user is provided by the front-end component. A conversion operation of a backend web page, for example, the user taps a picture, a link, or an icon in a web page, is performed by the back-end component. The database component stores a related signal of a web page, for example, a text and a picture in the web page, and information about a web page to which the web page can be redirected. When the user taps the picture, the link, or the icon in the web page, the front-end component is triggered to initiate an application programming interface (API) request to the back-end component. The API request is triggered by the user and is an external request. After receiving the API request from the front-end component, the back-end component initiates a data query request to the database component. The back-end component returns a query result fed back by the database component to the front-end component. The data query request is an API request triggered by the functional component in the cloud system resource set, and therefore, is an internal request.

The recommendation apparatus is configured with the foregoing two types of different models. The resource selection module 120 may select, based on the two types of different models and a user requirement for a cloud system resource set (for example, a cloud service type that needs to be supported by the cloud system resource set and a user's performance requirement for the cloud system resource set), the cloud system resource set meeting the requirement. A type of a model is not limited in this embodiment of this application. The two different types of models may be neural network models, or may be models established according to a statistical machine learning algorithm, for example, models established according to an algorithm such as a polynomial regression algorithm, a ridge regression algorithm, or an elastic network regression algorithm. Specific details in which the resource selection module 120 selects the cloud system resource set meeting the requirement are described below.

The following first describes training manners of the foregoing two types of models by using an example in which the foregoing two types of models are neural network models, and then describes specific details of determining, by the resource selection module 120, the cloud system resource set meeting the requirement.

1. A training mode of the neural network model.

An apparatus for training the two types of neural network models is not limited in this embodiment of this application. The two types of neural network models may be trained by the model training module 160 included in the recommendation apparatus. Alternatively, another apparatus may train the two types of neural network models. After training is completed, the trained two types of neural network models are configured in the recommendation apparatus. In this embodiment of this application, only an example in which the model training module 160 trains the two types of neural network models is used for description.

FIG. 3 is a schematic diagram of a training method for the component load model 140 and the system load distribution model 150. The method includes the following steps.

Step 301: The model training module 160 collects data from an existing cloud system resource set, where the collected data may be classified into two types: one type is structural data of the cloud system resource set, and the other type is running data of the cloud system resource set.

(1) The structure data of the cloud system resource set is used to indicate a cloud service that is supported by the cloud system resource set, composition of functional components in the cloud system resource set, and a resource configuration of each functional component. The structure data of the cloud system resource set includes any one or more of the following: a cloud service that is supported by each cloud system resource set, functional components included in each cloud system resource set, a quantity of virtual machines in each functional component in each cloud system resource set, a quantity of physical machines, a quantity of CPUs (including VCPUs) of each virtual machine/physical machine, a memory capacity of each virtual machine/physical machine, and a disk capacity of each virtual machine/physical machine.

(2) The running data of the cloud system resource set is data collected in a running process of the cloud system resource set, and the running data may represent overall performance of the cloud system resource set, and further, performance of each functional component in the cloud system resource set. The running data of the cloud system resource set includes any one or more of the following: an API call record of the cloud system resource set, and CPU utilization, memory utilization, and disk IOPS of each instance in each functional component in the cloud system resource set.

A data type included in the performance data of the cloud system resource set is not limited in this embodiment of this application. The data type included in the performance data of the cloud system resource set is related to the component load model 140 that needs to be trained. When the component load model 140 may determine other performance data in addition to determining average CPU (including a VCPU) utilization of the functional component, average memory utilization of the functional component, an average disk read/write rate of the functional component, the performance data that is of the cloud system resource set and that is collected by the model training module 160 also needs to include performance data of a same type, or data that can be used to calculate the other performance data. In this embodiment of this application, an example in which the performance data of the cloud system resource set includes CPU utilization, memory utilization, and disk IOPS of each instance in each functional component is used for description.

The API call record records execution information of each API request (including any external request executed by the cloud system resource set and any internal request triggered internally by the cloud system resource set) processed by the cloud system resource set, for example, an identifier (ID) of the API request, a triggering time of the API request, an end time of the API request, and a return result of the API request.

Step 302: The model training module 160 collates the collected data, and separately generates training sets of component load models 140 and training sets of system load distribution models 150.

Each component load model 140 corresponds to one functional component, and each system load distribution model 150 corresponds to one cloud system resource set. In other words, when there is a plurality of functional components, the model training module 160 needs to generate a training set of the component load model 140 corresponding to each functional component. When there is a plurality of cloud system resource sets, the model training module 160 needs to generate a training set of the component load model 140 corresponding to each cloud system resource set.

The component load model 140 corresponding to the functional component A is used as an example to describe data included in the training set of the component load model 140. The training set of the component load model 140 corresponding to the functional component A includes a concurrency of the functional component A, a quantity of instances in the functional component A, a quantity of CPUs (including VCPUs) of a single instance in the functional component A, a memory capacity of a single instance in the functional component A, a disk capacity of a single instance in the functional component A, average CPU (including a VCPU) utilization of the functional component A, average memory utilization of the functional component A, and average disk read/write rate of the functional component A.

It should be noted that in this embodiment of this application, an example in which each instance of the functional component A has a same quantity of CPUs, a same memory capacity, and a same disk capacity. If there are different types of instances in the functional component A, and each type of instance has a different quantity of CPUs, a different memory capacity, or a different disk capacity, the training set of the component load model 140 needs to include the quantity of CPUs, the memory capacity, or the disk capacity of each type of instance.

To generate the training set of the component load model 140, the model training module 160 needs to further collate the collected data. For example, the model training module 160 obtains, from the API call record, a quantity of internal requests received by the functional components in the cloud system resource set at a moment 1, to determine a concurrency of the functional component A at the moment 1. The model training module 160 analyzes the structural data of the cloud system resource set to determine a quantity of instances in the functional component A, a quantity of CPUs (including VCPUs) of a single instance in the functional component A, a memory capacity of a single instance in the functional component A, and a disk capacity of a single instance in the functional component A. The model training module 160 determines CPU utilization, memory utilization, and disk IOPS of each instance in each functional component in the cloud system resource set at the moment 1, and determines, by solving an average value, average CPU (including a VCPU) utilization in the functional component A corresponding to the moment 1, average memory utilization in the functional component A, and an average disk read/write rate in the functional component A.

It should be understood that the training set of the component load model 140 may be divided into a plurality of groups of training data based on a moment, and it needs to be ensured that when the component load model 140 is subsequently trained, input data and preset output data correspond to a same moment.

In a possible implementation, the model training module 160 may number supported cloud services, functional components, and instances of the functional components to form an organization tree and integrate the collected data into the organization tree. In this way, corresponding data may be queried through a corresponding number, and the training set of the component load model 140 can be relatively quickly generated.

A system load distribution model 150 corresponding to a cloud system resource set 1 is used as an example to describe data included in a training set of the system load distribution model 150. The training set of the system load distribution model 150 corresponding to the cloud system resource set 1 includes a concurrency of the cloud system resource set 1, and a concurrency of each functional component included in the cloud system resource set 1 under the concurrency of the cloud system resource set 1.

To generate the training set of the system load distribution model 150, the model training module 160 needs to further collate the collected data. For example, the model training module 160 obtains, from the API call record, the quantity of internal requests received by each functional component in the cloud system resource set at the moment 1, to determine a concurrency of each functional component A at the moment 1, and obtains a quantity of external requests received by the cloud system resource set at the moment 1, to determine a concurrency of the cloud system resource set at the moment 1.

It should be understood that the training set of the system load distribution model 150 may be divided into a plurality of groups of training data based on a moment, and it needs to be ensured that when the system load distribution model 150 is subsequently trained, input data and preset output data correspond to a same moment.

After generating the training set of the component load model 140 and the training set of the system load distribution model 150, the model training module 160 may train each component load model 140 and each system load distribution model 150. The following step 303 is a training process of the component load model 140. Step 304 is a training process of the system load distribution model 150.

Step 303: The model training module 160 trains the component load model 140 based on the training set of the component load model 140.

The component load model 140 corresponding to the functional component A is used as an example. The model training module 160 configures the concurrency of the functional component A in the training set of the component load model 140 corresponding to the functional component A, the quantity of instances in the functional component A, the quantity of CPUs (including VCPUs) of each instance, the memory capacity of each instance, and the disk capacity of each instance as input values, configures the average CPU (including a VCPU) utilization of the functional component A, the average memory utilization of functional component A, and the average disk read/write rate of functional component A as output values, and trains the component load model 140 corresponding to the functional component A in a supervised learning manner until a loss function converges.

Step 304: The model training module 160 trains the system load distribution model 150 based on the training set of the system load distribution model 150.

The system load distribution model 150 corresponding to the cloud system resource set 1 is used as an example. The model training module 160 uses, as an input value, the concurrency of the cloud system resource set 1 in the training set of the system load distribution model 150 corresponding to the cloud system resource set 1, uses, as an output value, the concurrency of each functional component in the cloud system resource set 1 under the input concurrency of the cloud system resource set 1, and trains the system load distribution model 150 corresponding to the cloud system resource set 1 in the supervised learning manner until a loss function converges.

2. A manner in which the recommendation apparatus determines a cloud system resource set meeting the user requirement.

Figure 4:
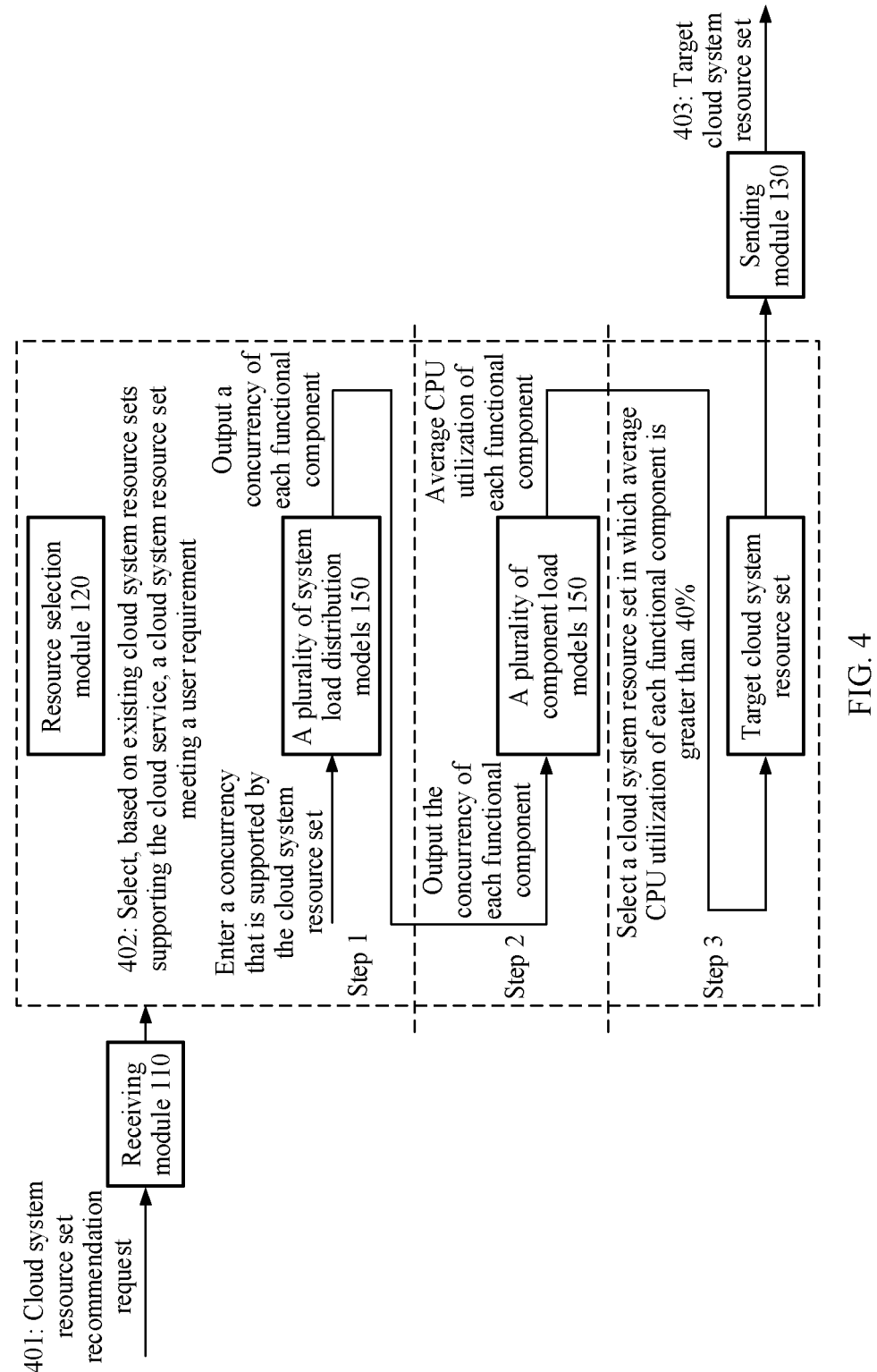
FIG. 4 is a schematic diagram of a system recommendation method according to this application.

FIG. 4 is a schematic diagram of a system recommendation method according to an embodiment of this application. The method includes the following steps.

Step 401: The receiving module 110 receives a cloud system resource set recommendation request triggered by a user. The cloud system resource set recommendation request includes a user requirement for a cloud system resource set (or a user requirement), where the requirement includes a cloud service that needs to be supported by the cloud system resource set, and may further include any one or more of the following information: a concurrency that needs to be supported by the cloud system resource set, average CPU utilization that needs to be achieved by the cloud system resource set, average memory utilization that needs to be achieved by the cloud system resource set, an average disk read/write rate that needs to be achieved by the cloud system resource set, a rent range of the cloud system resource set, and average CPU utilization, average memory utilization, and average disk read/write rate that need to be achieved by the functional component in the cloud system resource set.

FIG. 5 is a selection interface displayed on a display of a client 200 or a display of a computing device 10. In the interface, a user is prompted to select a cloud service that needs to be supported by a cloud system resource set. The user can select the cloud service by tapping a corresponding option.

Further, FIG. 6 is another selection interface displayed to the user on the display of the client 200 or the display of the computing device 10. The user may set load of the cloud system set (for example, the concurrency that needs to be supported by the cloud system resource set) and performance (the average CPU utilization, average memory utilization, and average disk read/write rate that need to be achieved by the cloud system resource collection). Options in FIG. 6 further include a default value. When the user has no requirement on the load and performance of the cloud system set, or cannot determine the load and performance that the cloud system set needs to achieve, the default value may be selected. A concurrency that needs to be supported by the cloud system resource set corresponding to the "default" option, average CPU utilization that needs to be achieved by the cloud system resource set, average memory utilization that needs to be achieved by the cloud system resource set, and an average disk read/write rate that needs to be achieved by the cloud system resource set are preset values. A manner of determining the preset value is not limited in this embodiment of this application, and the preset value may be an empirical value, or may be an average value of data corresponding to all existing cloud system resource sets supporting the cloud service.

Alternatively, the user may set only one or more parameters of the concurrency that needs to be supported by the cloud system resource set, the average CPU utilization that needs to be achieved by the cloud system resource set, the average memory utilization that needs to be achieved by the cloud system resource set, and the average disk read/write rate that needs to be achieved by the cloud system resource set. A parameter that is not set by the user may be considered as no specific requirement by default, or a parameter that is not set by the user may be set as a preset value. The preset value may be an empirical value, or may be a value matched based on the parameters that are set by the user.

In a possible implementation, in addition to setting one or more parameters of the concurrency that needs to be supported by the cloud system resource set, the average CPU utilization that needs to be achieved by the cloud system resource set, the average memory utilization that needs to be achieved by the cloud system resource set, and the average disk read/write rate that needs to be achieved by the cloud system resource set, further, inside the cloud system resource set, the user may further set one or more parameters of average CPU utilization that needs to be achieved by one or more functional components in the cloud system resource set, average memory utilization that needs to be achieved by the one or more functional components, and average disk read/write rates that need to be achieved by the one or more functional components. A prerequisite for setting is that the user may first determine a type of a functional component included in the cloud system resource set. For example, the user may configure a cloud system resource set in an interface displayed to the user by using the display in the client 200 or by using the display in the computing device 10. The requested cloud system resource set that supports the web page service and that is requested by the cloud system resource set recommendation request includes a front-end component, a back-end component, and a database component. Further, the user configures, in the interface displayed to the user by using the display in the client 200 or the display in the computing device 10, one or more parameters of the average CPU utilization that needs to be achieved by the one or more functional components in the cloud system resource set, the average memory utilization that needs to be achieved by the one or more functional components, and the average disk read/write rate that needs to be achieved by the one or more functional components. For example, the user may configure, in the interface displayed to the user by using the display in the client 200 or the display in the computing device 10, average CPU utilization that needs to be achieved by the front-end component, average memory utilization that needs to be achieved, and an average disk read/write rate.

FIG. 7 is another selection interface displayed to a user by a display in the client 200 or a display in the computing device 10. The user may select a payment mode (monthly settlement, daily settlement, and annual settlement) and a specific fee for the cloud system resource set.

By tapping a corresponding option, the user may trigger the client 200 to send a cloud system resource set recommendation request to a recommendation apparatus.

Step 402: After the receiving module 110 receives the system resource set recommendation request, the resource selection module 120 may select, based on existing cloud system resource sets supporting the cloud service, a target cloud system resource set meeting the user requirement.

The resource selection module 120 may select, by using a pre-trained system load distribution model 150 corresponding to the cloud system resource set used to support the cloud service and a component load model 140 corresponding to each functional component, the cloud system resource set meeting the user requirement.

The manner of selecting the cloud system resource set meeting the user requirement is described through an example in which the system resource set recommendation request includes the cloud service (for example, the web page service is supported) that needs to be supported by the cloud system resource set, the concurrency that needs to be supported by the cloud system resource set (300 concurrencies are used as an example), and the average CPU utilization that needs to be achieved by the cloud system resource set (40% is used as an example).

Step 1: The resource selection module 120 may first determine, based on the system load distribution model 150 corresponding to the existing cloud system resource set used to support the cloud service and the concurrency that needs to be achieved by the cloud system resource set, a concurrency of each functional component in the existing cloud system resource set used to support the cloud service.

For example, the resource selection module 120 may query, based on the cloud service that needs to be provided by the cloud system resource set and that is carried in the cloud system resource set recommendation request, the system load distribution model 150 corresponding to the existing cloud system resource set used to support the cloud service.

For the system load distribution model 150 corresponding to any existing cloud system resource set used to support the cloud service, the resource selection module 120 may input, into a system load model corresponding to the cloud system resource set, the concurrency that needs to be supported by the cloud system resource set, and may determine the concurrency of each functional component in the cloud system resource set.

For example, there are three cloud system resource sets used to support the web page service in the existing cloud system resource sets: a cloud system resource set 1, a cloud system resource set 2, and a cloud system resource set 3. The cloud system resource set 1 includes a functional component A, a functional component B, and a functional component C. The cloud system resource set 2 includes a functional component A and a functional component B. The cloud system resource set 3 includes a functional component A, a functional component B, a functional component C, and a functional component D.

A system load distribution model f1 (a system concurrency) corresponding to the cloud system resource set 1=(a concurrency of the functional component A, a concurrency of the functional component B, a concurrency of the functional component C).

A system load distribution model f2 (a system concurrency) corresponding to the cloud system resource set 2=(a concurrency of the functional component A, a concurrency of the functional component B).

A system load distribution model f3 (a system concurrency) corresponding to the cloud system resource set 3=(a concurrency of the functional component A, a concurrency of the functional component B, a concurrency of the functional component C, a concurrency of the functional component D).

The resource selection module 120 inputs the concurrency (300) that needs to be supported by the cloud system resource set into the system load distribution model f1 (the system concurrency), so as to obtain the concurrency f1(300)-A of the functional component A, the concurrency f1(300)-B of the functional component B, and the concurrency f1(300)-C of the functional component C.

The resource selection module 120 inputs the concurrency (300) that needs to be supported by the cloud system resource set into the system load distribution model f2(300), so as to obtain the concurrency f2(300)-A of the functional component A and the concurrency f2(300)-B of the functional component B.

The resource selection module 120 inputs the concurrency (300) that needs to be supported by the cloud system resource set into the system load distribution model f3 (the system concurrency), so as to obtain the concurrency f3(300)-A of the functional component A, the concurrency f3(300)-B of the functional component B, the concurrency f3(300)-C of the functional component C, and the concurrency f4(300)-D of the functional component D.

Step 2: The resource selection module 120 determines, based on the component load model 140 and a concurrency of each functional component in the existing cloud system resource sets used to support the cloud service, the average CPU utilization of each functional component in the existing cloud system resource sets used to support the cloud service.

For any existing cloud system resource set used to provide the cloud service, the resource selection module 120 may input the concurrency of each functional component in the cloud system resource set calculated in the first step into the component load model 140 corresponding to each corresponding functional component, to determine the average CPU utilization of each functional component.

It is still used as an example in which the cloud service that needs to be provided by the cloud system resource set and that is carried in the cloud system resource set recommendation request is a web page application. There are three cloud system resource sets used for the web page application in the existing cloud system resource sets, and there are four different functional components in total: a functional component A, a functional component B, a functional component C, and a functional component D.

A component load model Fa corresponding to the functional component A (a concurrency of the functional component A, CPU cores of a single instance of the functional component A, a memory capacity of a single instance of the functional component A, a disk capacity of a single instance of the functional component A, a quantity of instances of the functional component A)=(Average CPU utilization of the functional component A, average memory utilization of the functional component A, an average disk read/write rate of the functional component A).

A component load model Fb corresponding to the functional component B (a concurrency of the functional component B, CPU cores of a single instance of the functional component B, a memory capacity of a single instance of the functional component B, a disk capacity of a single instance of the functional component B, a quantity of instances of the functional component B)=(average CPU utilization of the functional component B, average memory utilization of the functional component B, an average disk read/write rate of the functional component B).

A component load model Fc corresponding to the functional component C (a concurrency of the functional component C, CPU cores of a single instance of the functional component C, a memory capacity of a single instance of the functional component C, a disk capacity of a single instance of the functional component C, a quantity of instances of the functional component C)=(average CPU utilization of the functional component C, average memory utilization of the functional component C, an average disk read/write rate of the functional component C).

A component load model Fd corresponding to the functional component D (a concurrency of the functional component D, CPU cores of a single instance of the functional component D, a memory capacity of a single instance of the functional component D, a disk capacity of a single instance of the functional component D, a quantity of instances of the functional component D)=(average CPU utilization of the functional component D, average memory utilization of the functional component D, an average disk read/write rate of the functional component D).

For the cloud system resource set 1, the resource selection module 120 may input the concurrency f1(300)-A of the functional component A determined in the first step into the component load model Fa corresponding to the functional component A, input the concurrency f1(300)-B of the functional component B into the component load model Fb corresponding to the functional component B, and input the concurrency f1(300)-C of the functional component C into the component load model Fc corresponding to the functional component C. The average CPU utilization of the functional component A may be determined based on an output value of the component load model Fa corresponding to the functional component A. The average CPU utilization of the functional component B may be determined based on an output value of the component load model Fb corresponding to the functional component B. The average CPU utilization of the functional component C may be determined based on an output value of the component load model Fc corresponding to the functional component C.

For the cloud system resource set 2, the resource selection module 120 may input the concurrency f2(300)-A of the functional component A determined in the first step into the component load model Fa corresponding to the functional component A, and input the concurrency f2(300)-B of the functional component B into the component load model Fb corresponding to the functional component B. The average CPU utilization of the functional component A may be determined based on an output value of the component load model Fa corresponding to the functional component A. The average CPU utilization of the functional component B may be determined based on an output value of the component load model Fb corresponding to the functional component B.

For the cloud system resource set 3, the resource selection module 120 may input the concurrency f3(300)-A of the functional component A determined in the first step into the component load model Fa corresponding to the functional component A, input the concurrency f3(300)-B of the functional component B into the component load model Fb corresponding to the functional component B, input the concurrency f3(300)-C of the functional component C into the component load model Fc corresponding to the functional component C, and input the concurrency f4 (300)-D of the functional component D into the component load model Fd corresponding to the functional component D. The average CPU utilization of the functional component A may be determined based on an output value of the component load model Fa corresponding to the functional component A. The average CPU utilization of the functional component B may be determined based on an output value of the component load model Fb corresponding to the functional component B. The average CPU utilization of the functional component C may be determined based on an output value of the component load model Fc corresponding to the functional component C. The average CPU utilization of the functional component D may be determined based on an output value of the component load model Fd corresponding to the functional component D.

Step 3: The resource selection module 120 selects a cloud system resource set, where average CPU utilization of each functional component in the cloud system resource set is greater than average CPU utilization that needs to be supported by the cloud system resource set, and the cloud system resource set is the target resource set.

The resource selection module 120 may alternatively select a cloud system resource set, where average CPU utilization of each functional component in the cloud system resource set is greater than the average CPU utilization that needs to be supported by the cloud system resource set, and the cloud system resource set is the target resource set.

If the cloud system resource set recommendation request further carries the rent range, the resource selection module 120 may further filter the target cloud system resource set that meets the rent range from the cloud system resource sets meeting the average CPU utilization of the cloud system resource set. Certainly, before performing the first step, the resource selection module 120 may also remove a cloud system resource set that does not meet the rent range, and perform the first step only for the cloud system resource set that meets the rent range.

Step 403: The sending module 130 feeds back the selected target cloud system resource set to the user.

For example, the sending module 130 may feed back the selected target cloud system resource set to the client 200. The client 200 receives the cloud system resource set fed back by the sending module 130, and may push the target cloud system resource set fed back by the sending module 130 to the user, so that the user can view the target cloud system resource set.

For another example, the sending module 130 may push the selected target cloud system resource set to the user by using the display of the computing device 10, so that the user can view the selected target cloud system resource set.

As shown in FIG. 8, the client 200 may list the cloud system resource sets fed back by the sending module 130 and present the cloud system resource sets to the user by using the display in the client 200 or the display in the computing device 10. The client 200 may arrange, in an ascending or descending order of prices, the target cloud system resource sets fed back by the sending module 130.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

The foregoing descriptions are merely specific implementations of the present disclosure. Any variation or replacement figured out by a person skilled in the art according to the specific implementations provided in the present disclosure shall fall within the protection scope of the present disclosure.

What is claimed is:

1. A method comprising:

receiving from a user device, a cloud system resource set recommendation request requesting cloud system resource sets that can support a target cloud service and meet a performance requirement, wherein the target cloud service is implemented by a plurality of functions and is associated with a plurality of functional components, wherein each functional component implements a different function in the plurality of functions for providing specific to the target cloud service, wherein the performance requirement comprises an overall performance requirement of the cloud system resource sets and an individual performance requirement of each functional component in the cloud system resource sets, and wherein the performance requirement includes an external concurrency requirement and an internal concurrency requirement, wherein the external concurrency requirement indicates a first quantity of simultaneous external requests initiated by a device or a user outside a cloud system resource set that can be process by the cloud system resource set, and wherein the internal concurrency requirement indicates a second quantity of simultaneous internal request that can be initiated within the cloud system resource set by each of the functional components in the cloud system resource set;

selecting, based on the cloud system resource set recommendation request and from existing cloud system resource sets supporting the target cloud service, the cloud system resource sets meeting the performance requirement, wherein the cloud system resource sets comprise the plurality of functional components; and sending information about the cloud system resource sets to the user device.

2. The method of claim 1, wherein the performance requirement further comprises:

an average central processing unit (CPU) utilization that needs to be achieved by the cloud system resource sets; and an average memory utilization that needs to be achieved by the cloud system resource sets.

3. The method of claim 1, wherein the cloud system resource set recommendation request further comprises a rent range that needs to be met by the cloud system resource sets.

4. The method of claim 1, further comprising selecting, based on system load distribution models corresponding to the existing cloud system resource sets and a component load model corresponding to the plurality of functional components from the existing cloud system resource sets, the cloud system resource sets meeting the performance requirement, wherein a system load distribution model corresponding to each of the existing cloud system resource sets determines a first load of each of the functional components in each of the existing cloud system resource sets based on a second load of each of the existing cloud system resource sets, and wherein the component load model corresponding to each of the functional components determines performance data of the each of the functional components based on the first load.

5. The method of claim 4, wherein before selecting the cloud system resource sets, the method further comprises:

collecting first structure data and first running data of the existing cloud system resource sets, wherein second structure data of each of the existing cloud system resource sets indicates composition of functional components in each of the existing cloud system resource sets and a resource configuration of each of the functional components, and wherein second running data of each of the existing cloud system resource sets indicates performance of each of the existing cloud system resource sets in a running process and performance of each of the functional components in each of the existing cloud system resource sets; and generating, based on the first structure data and the first running data, the system load distribution models and the component load model.

6. The method of claim 5, further comprising:

integrating the first structure data and the first running data into first training sets of a plurality of component load models and second training sets of a plurality of system load distribution models;

generating, based on the first training sets, the component load model; and generating, based on the second training sets, the system load distribution models.

7. An apparatus comprising:

a memory configured to store instructions;

a receiver configured to receive, from a user device, a cloud system resource set recommendation request requesting cloud system resource sets that can support a target cloud service and meet a performance requirement, wherein the target cloud service is implemented by a plurality of functions and is associated with a plurality of functional components, wherein each functional component implements a different function in the plurality of functions for providing the target cloud service, wherein the performance requirement comprises an overall performance requirement of the cloud system resource sets and an individual performance requirement of each functional component in the cloud system resource sets, and wherein the performance requirement includes an external concurrency requirement and an internal concurrency requirement, wherein the external concurrency requirement indicates a first quantity of simultaneous external requests initiated by a device or a user outside a cloud system resource set that can be process by the cloud system resource set, and wherein the internal concurrency requirement indicates a second quantity of simultaneous internal request that can be initiated within the cloud system resource set by each of the functional components in the cloud system resource set;

a processor coupled to the receiver and configured to execute the instructions to cause the apparatus to select, based on the cloud system resource set recommendation request and from existing cloud system resource sets supporting the target cloud service, the cloud system resource sets meeting the performance requirement, wherein the cloud system resource sets comprise the plurality of functional components; and a transmitter coupled to the receiver and the processor and configured to send information about the cloud system resource sets to the user device.

8. The apparatus of claim 7, wherein the performance requirement further comprises:

an average disk read/write rate that needs to be achieved by the cloud system resource sets; and average CPU utilization that needs to be achieved by the plurality of functional components in the cloud system resource sets.

9. The apparatus of claim 7, wherein the cloud system resource set recommendation request further comprises a rent range that needs to be met by the cloud system resource sets.

10. The apparatus of claim 7, wherein the processor is further configured to execute the instructions to cause the apparatus to select, based on system load distribution models corresponding to the existing cloud system resource sets and a component load model corresponding to the plurality of functional components, the cloud system resource sets meeting the performance requirement, wherein a system load distribution model corresponding to each of the existing cloud system resource sets determines a first load of each of the functional components in each of the existing cloud system resource sets based on a second load of each of the existing cloud system resource sets, and wherein a component load model corresponding to each of the functional components determines performance data of the each of the functional components based on the first load.

11. The apparatus of claim 10, wherein the processor is further configured to execute the instructions to cause the apparatus to:

collect first structure data and first running data of the existing cloud system resource sets, wherein second structure data of each of the existing cloud system resource sets indicates composition of functional components in each of the existing cloud system resource sets and a resource configuration of each of the functional components, and wherein second running data of each of the existing cloud system resource sets indicates performance of each of the existing cloud system resource sets in a running process and performance of each of the functional components in each of the existing cloud system resource sets; and generate, based on the first structure data and the first running data, the system load distribution models and the component load model.

12. The apparatus of claim 11, wherein the processor is further configured to execute the instructions to cause the apparatus to:

integrate the first structure data and the first running data into first training sets of a plurality of component load models and second training sets of a plurality of system load distribution models;

further generate, based on the first training sets, the component load model; and further generate, based on the second training sets, the system load distribution models.

13. A computer program product comprising computer-executable instructions that are stored on a non-transitory computer-readable medium and that, when executed by a processor, cause a computing device to:

receive, from a user, a cloud system resource set recommendation request requesting cloud system resource sets that can support a target cloud service, meet a performance requirement, wherein the target cloud service is implemented by a plurality of functions and is associated with a plurality of functional components, wherein each functional component implements a different function in the plurality of functions for providing the target cloud service, wherein the performance requirement comprises an overall performance requirement of the cloud system resource sets and an individual performance requirement of each functional component in the cloud system resource sets, and wherein the performance requirement includes an external concurrency requirement and an internal concurrency requirement, wherein the external concurrency requirement indicates a first quantity of simultaneous external requests initiated by a device or a user outside a cloud system resource set that can be process by the cloud system resource set, and wherein the internal concurrency requirement indicates a second quantity of simultaneous internal request that can be initiated within the cloud system resource set by each of the functional components in the cloud system resource set;

select, based on the cloud system resource set recommendation request and from existing cloud system resource sets supporting the target cloud service, the cloud system resource sets meeting the performance requirement, wherein the cloud system resource sets comprise the plurality of functional components; and send information about the cloud system resource sets.

14. The computer program product of claim 13, wherein the performance requirement further comprises a cost constraint to be met by the cloud system resource sets.

15. The computer program product of claim 13, wherein the performance requirement further comprises:

an average memory utilization that needs to be achieved by the plurality of functional components in the cloud system resource sets; and an average disk read/write rate that needs to be achieved by the plurality of functional components in the cloud system resource sets.

16. The computer program product of claim 13, wherein the cloud system resource set recommendation request further comprises a rent range to be met by the cloud system resource sets.

17. The computer program product of claim 13, wherein the computer-executable instructions further cause the computing device to further select, based on system load distribution models corresponding to the existing cloud system resource sets and a component load model corresponding to the plurality of functional components from the existing cloud system resource sets, the cloud system resource sets meeting the performance requirement, wherein a system load distribution model corresponding to each of the existing cloud system resource sets determines a first load of each of the functional components in each of the existing cloud system resource sets based on a second load of each of the existing cloud system resource sets, and wherein a component load model corresponding to each of the functional components determines performance data of the each of the functional components based on the first load.

18. The computer program product of claim 17, wherein before selecting the cloud system resource sets, the computer-executable instructions further cause the computing device to:

collect first structure data and first running data of the existing cloud system resource sets, wherein second structure data of each of the existing cloud system resource sets indicates composition of functional components in each of the existing cloud system resource sets and a resource configuration of each of the functional components, and wherein second running data of each of the existing cloud system resource sets indicates performance of each of the existing cloud system resource sets in a running process and performance of each of the functional components in each of the existing cloud system resource sets; and generate, based on the first structure data and the first running data, the system load distribution models and the component load model.

19. The computer program product of claim 18, wherein the computer-executable instructions further cause the computing device to integrate the first structure data and the first running data into first training sets of a plurality of component load models and second training sets of a plurality of system load distribution models.

20. The computer program product of claim 19, wherein the computer-executable instructions further cause the computing device to:

further generate, based on the first training sets, the component load model; and further generate, based on the second training sets, the system load distribution models.

* * * * *